United States Patent
Barbe et al.

[11] Patent Number: 5,249,428
[45] Date of Patent: Oct. 5, 1993

[54] METHOD AND APPARATUS FOR ESTABLISHING A CONTROLLED ATMOSPHERE IN THE COMPARTMENTS OF A VESSEL FOR CONSERVING FRESH VEGETABLES

[75] Inventors: Christian Barbe, Fontenay-Aux-Roses; Frédéric Fillet, Issy-Les-Moulineaux, both of France

[73] Assignee: L'Air Liquide, Societe Anonyme Pour L'Etude et L'Exploitation Des Procedes Georges Claude, Paris, France

[21] Appl. No.: 901,889

[22] Filed: Jun. 22, 1992

[30] Foreign Application Priority Data

Jun. 28, 1991 [FR] France .................. 91 08060

[51] Int. Cl.⁵ .............................. F24F 3/16
[52] U.S. Cl. ........................... 62/78; 426/418; 426/419; 96/7; 95/45
[58] Field of Search ........... 62/78; 426/418, 419; 55/16, 158

[56] References Cited

U.S. PATENT DOCUMENTS

| | | | |
|---|---|---|---|
| 4,817,391 | 4/1989 | Roe et al. | 62/78 |
| 4,894,997 | 1/1990 | Urushizaki et al. | 62/78 |
| 4,976,109 | 12/1990 | Garrett | 62/78 |
| 5,063,753 | 11/1991 | Woodruff | 62/78 |

FOREIGN PATENT DOCUMENTS

| | | |
|---|---|---|
| 0160325 | 11/1985 | European Pat. Off. |
| 0292834 A3 | 11/1988 | European Pat. Off. |
| 0315309 | 5/1989 | European Pat. Off. |
| 2521402 | 8/1983 | France |

Primary Examiner—Ronald C. Capossela
Attorney, Agent, or Firm—Curtis, Morris & Safford

[57] ABSTRACT

The different compartments of the preserving vessel are sequentially supplied with a controlled atmosphere by means of a first permeator providing a controlled atmosphere with an oxygen content of about 2% for the step of loading the compartment, then by means of an another separator providing a controlled atmosphere with an oxygen content which does not exceed 1% for a phase of extended conservation. The separators are typically of the type with a membrane and are supplied through a group of common compression, and the oxygen contents of the gases which are provided are controlled by means of flow limiters located downstream.

15 Claims, 1 Drawing Sheet

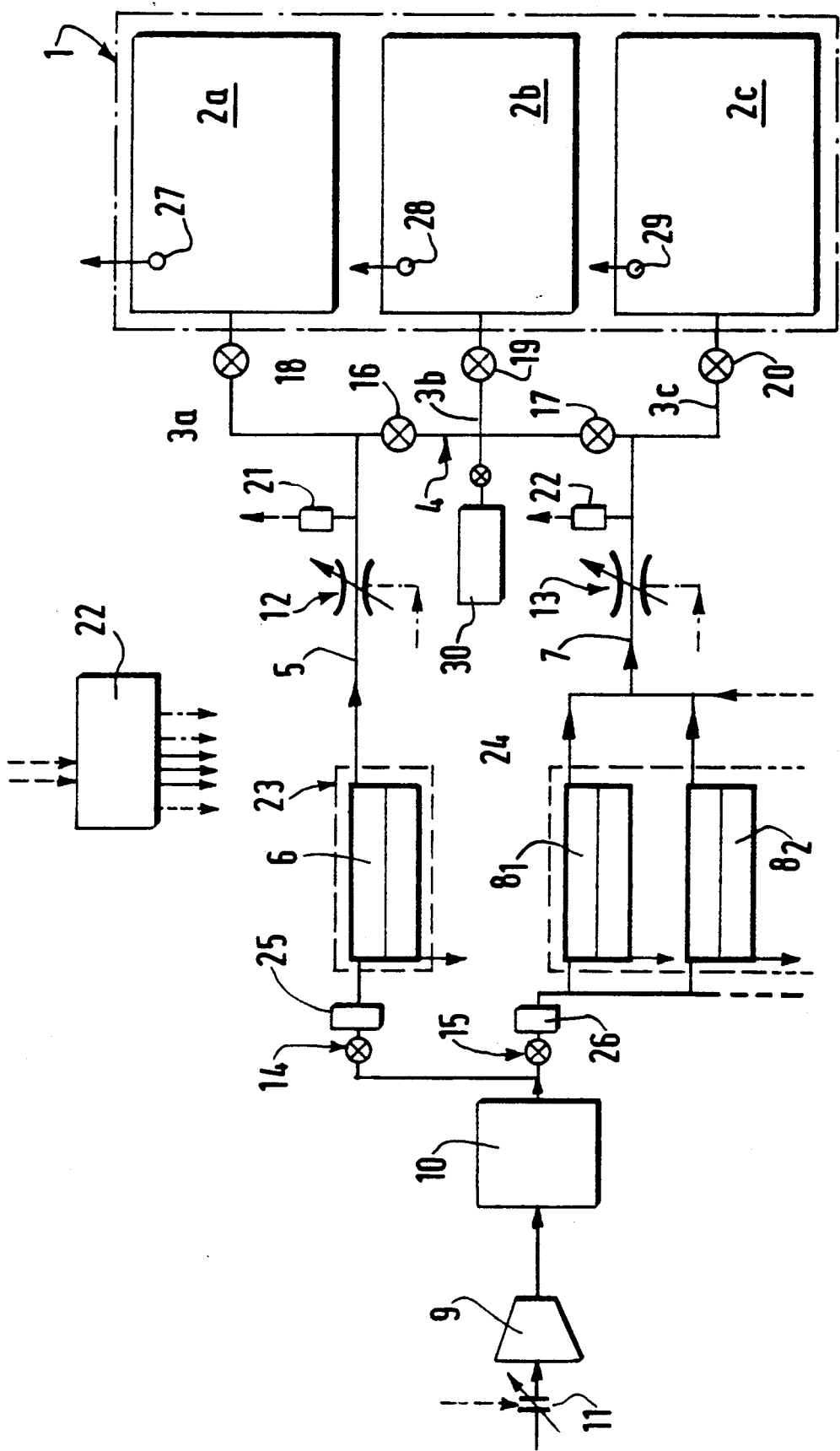

METHOD AND APPARATUS FOR ESTABLISHING A CONTROLLED ATMOSPHERE IN THE COMPARTMENTS OF A VESSEL FOR CONSERVING FRESH VEGETABLES

BACKGROUND OF INVENTION (a) Field of the Invention

The present invention concerns a process and apparatus for establishing a controlled atmosphere with a low content of oxygen in at least one first and one second compartments of a vessel for preserving fresh vegetables by means of a device for separating non-cryogenic air.

(b) Description of Prior Art

The long term storage of certain agricultural products, such as fruits, for example apples or kiwis, is currently ensured by means of refrigerated vessels. Certain recent devices additionally provide for maintaining controlled atmosphere with a low content of oxygen and carbon dioxide in this vessel, typically 2% for each of these components, said controlled atmosphere being obtained by separation from the air, by permeation or adsorption, and reduction of $CO_2$ on activated carbon. This type of atmosphere, however, provides a good conservation of the aspect of the fruit only with the joint application of oxidizing products.

The Applicant has observed that a long term conservation without addition of anti-oxidizing products was possible with an atmosphere containing at most 1% oxygen and 1% carbon dioxide. Such an atmosphere cannot be kept at a reasonable cost through the present devices for air separation to provide a controlled atmosphere for conservation. On the other hand, this type of conservation presents particular seasonal specific aspects which do not justify the use of very costly devices for providing controlled atmospheres. As a matter of fact, in so far as apples are concerned, the user is typically provided with a certain number of compartments, for example 10, which may each contain 300 tons of apples. At the time of harvesting, the user loads the vessel of conservation at the rate of one compartment per day, in which the change from an ambient atmosphere to a controlled atmosphere of conservation should be obtained in less than 24 hours. Any loaded and conditioned compartment should thereafter be maintained for an extended period of time (which could exceed six months) under optimum conditions of conservation.

SUMMARY OF INVENTION

It is an object of the present invention to propose a process with good performance, which is reliable, and enables, at low cost, to ensure during the long period of conservation, a very low content of oxygen which does not exceed 1%, and to rapidly treat, individually and without discontinuity, each compartment during the step of loading.

For this purpose, according to a characteristic of the invention, the process comprises the steps of operating at least a first and a second separators in parallel, which may be connected to the first and second compartments, controlling the first separator in order to produce at the outlet an atmosphere having a first content of oxygen, typically not exceeding 1%, controlling the second separator in a first mode in order to produce at the outlet an atmosphere having a second content of oxygen higher than the first content, typically about 2%, loading the first compartment with fresh products, connecting the second separator while in its first mode, to the first compartment, loading the second compartment with fresh products, connecting the first compartment to the second separator and connecting the second separator, while in its first load, to the second compartment, then, after a predetermined period, providing to the first and second compartments an atmosphere having the first content of oxygen, typically provided by the first separator and the second separator adjusted in a second mode to also provide at the outlet an atmosphere having the first content of oxygen.

According to a particular characteristic of the invention, the first and second separators are of the type with a membrane and the first and second contents of oxygen are obtained by modulating the outlet flows respectively of the first and second separators which are typically supplied through a common group of compression, advantageously by placing a common air purification station therebetween.

Such a process, which utilizes at least two separators mounted in parallel, enables at the time of harvest, to use the second separator for providing the controlled atmosphere for loading consecutive compartments while the first separator is used in permanence to provide to the already loaded compartments the controlled atmosphere of maintenance with a very low content of oxygen, the second separator then supplementing the first one for the long term maintenance phase at the end of the harvest.

It is also an object of the present invention to provide a device for carrying out the process defined above, comprising a compression unit supplying at least a first and a second membrane separators, distribution means selectively connecting the outlet of each separator to the compartments of the vessel, and a flow controlled limiting means at the outlet of the respective separators.

BRIEF DESCRIPTION OF DRAWINGS

Other characteristics and advantages of the present invention will appear from the description which follows of an embodiment, given by way of illustration but without limitation, with reference to the annexed drawing, in which:

the single FIGURE is a schematic illustration of a device for carrying out the process according to the invention.

DESCRIPTION OF PREFERRED EMBODIMENTS

The single FIGURE, shows a vessel 1 for the storage and conservation of fruits including a series of compartments $2a$–$2c$... each provided with a conservation gas feeding ducts $3a$–$3c$... connected to a feeding and distribution line 4, and an escape opening, provided with a check valve (not illustrated).

According to the invention, line 4 is connected through a distribution duct 5, to the outlet of a first membrane type permeator 6, and, through a distribution duct 7 to the outlet of at least one, typically two membrane type permeators $8_1$, $8_2$, depending on the capacity and the number of compartments 2 of vessel 1. The inlets of the permeators 6, $8_1$, $8_2$, are fed through a common compression unit 9 via purifier 10, typically for oil removal, dusting, and, possibly, the warming of compressed air. The air inlet of the compression unit 9 is provided with a progressive control valve 11. Each duct 5, 7 is provided with a control flow limiter 12, 13. A feeding valve with opened and closed positions, 14, 15 is provided upstream, respectively, of the permeator 6 and the series of permeators $8_1$, $8_2$. The feeding line 4 includes a series of distribution valves, with opened and closed, 16, 17 . . . on both sides of each duct 3 for feeding a compartment 2. Each feeding duct 3 includes a valve with opened and closed positions 18, 19, 20. Each distribution duct 5, 7 is provided at the downstream end, with a pressure captor 21, 22, respectively, providing a pressure signal which is indicative of the pressure in the downstream compartments 2a, 2b, 2c to a central control unit 22 for controlling the feeding valves 14–15, the central unit 22 also ensuring the control of the limiters 11–13 and the various distribution valves 16–20 . . .

The operation of the device is as follows: limiter 12 in duct 5 is adjusted so that the oxygen content of the flow which is delivered by the first permeator 6 into duct 5 does not exceed 1%. Limiter 13 in duct 7 is first controlled so that the oxygen content of the flow which is delivered by the second permeators 8 into duct 7 be of the order of 2%. The distribution network 4, 3, is free to call for the flows delivered by permeators 6, 8, and maintenance of the performances are obtained by the upstream regulator 11 which ensures the maintenance of back flow air pressure notwithstanding the flow which is used.

At the start of the harvest, the user starts by loading the first compartment 2a. Once this loading is finished, the first permeator 6 is isolated through valve 14 and, while valves 19 and 20 are closed and valves 16–18 are opened, the second permeators 8 rapidly provide, during less than 24 hours, in compartment 2a, a controlled atmosphere loaded with an oxygen content slightly lower than 2%, taking into account the breathing of the products. The second permeators 8 are then isolated by valve 15. While valve 14 is opened and valve 16 is closed, the first permeator 6 then provides to the first compartment 2a a controlled atmosphere with an oxygen content lower than 1%. At the same time, the user has started to load the second compartment 2b. Once this loading is terminated, the second permeators 8 are again operated by opening valve 15, valves 17 and 18 being opened and valve 20 closed, to rapidly provide in the second compartment 2b a first controlled atmosphere loaded with an oxygen content slightly lower than 2%, after which valve 17 is closed and the first permeator 6 feeds the two compartments 2a and 2b with a controlled atmosphere having a low content of oxygen, etc.

When the last compartment has been loaded and there is provided a controlled loading atmosphere with a content of oxygen higher than 1%, all the valves 14–20 being opened, the limiter 13 at the outlet of the second permeators $8_1$, $8_2$ is set in a second mode so as to give, as with the first permeator 6, a controlled atmosphere with an oxygen content not exceeding 1%. During this operation of maintenance, which could exceed six (6) months, when the pressure has reached a predetermined level in ducts 5 and 7, either of the valves 14 and 15 isolates the corresponding permeator(s) for a period of time which depends on the consumption of nitrogen in the compartments which is detected by captors 21–22, after which the permeators are again operated.

According to a specific embodiment, the first permeator 6 and the series of second permeators 8 are each disposed in a thermostatically controlled vessel 23 and 24, respectively, and the lines for feeding compressed purified air from the first permeator 6 and from the second series of permeators 8 are each advantageously provided with a warming device 25, 26, enabling, for example during the step of providing a loading atmosphere for the compartment, to separately control the temperature of the vessel 23, 24 to a given value which is higher than the standard value, which enables to temporarily increase the production capacity of the permeators and consequently to substantially reduce the number which is required to obtain a given flow and consequently, to reduce the cost of installing the device. It is also possible to improve the average energy consumption of the device by providing a compression unit 9 with two compressors which are used by the network, only one of these compressors being used during the maintenance phase while the two are used during the phase for providing a loading atmosphere during the harvesting period.

Although the present invention has been described with reference to specific embodiments, it is not limited thereto but on the contrary is capable of modifications and variants which will appear to one skilled in the art. In particular, the use of either or all of the series of permeators 6 and $8_1$, $8_2$ may be controlled by means of oxygen analyses in the different compartments 2a–2c from probes 27–29 provided in the latter, and/or by means of pressure captors in line 4, upstream of respective valves 16, 17, and line 4 may be associated with a buffer container 30. Feeding ducts 3a–3c may be connected to two distinct feeding lines 4, 4 each connected to one of the distribution ducts 5 and 7.

We claim:

1. A method of conserving fresh edible products in a storing housing comprising at least two storing compartments, comprising the steps of:
   a) providing a non-cryogenic air separation device comprising at least first and second separators each having an air inlet and an oxygen-depleted gas outlet, said first separator operable to supply at its said outlet a gas having a first content of oxygen and at least said second separator operable in a first mode to supply at its said outlet a gas having a second content of oxygen higher than said first content;
   b) loading the first compartment with fresh products;
   c) connecting the loaded first compartment to the outlet of the second separator operated in said first mode;
   d) loading the second compartment with fresh products;
   e) disconnecting the loaded first compartment from the outlet of the second separator and connecting said loaded first compartment to the outlet of the first separator and connecting the loaded second compartment to the outlet of the second separator operated in said first mode; and
   f) after a predetermined period of time, supplying the first and second loaded compartments with a gas supplied by the air separation device and having substantially the first content of oxygen.

2. The method of claim 1, wherein the second separator is operable in a second mode to supply at its outlet a gas having substantially the first content of oxygen.

3. The method of claim 2, wherein each separator is a permeation membrane separator and wherein the first and second contents of oxygen in the supplied gas are obtained by modulating the outlet flow of the respective permeator.

4. The method of claim 3, further comprising feeding the first and second separators with a purified flow of air under pressure supplied by a common air compression unit.

5. The method of claim 4, further comprising controlling the temperature of at least the second separator.

6. The method of claim 5, comprising the step of increasing the temperature of the feed air supplied to the second separator at least during part of step c).

7. The method of claim 2, wherein the first oxygen content is not more than 1%.

8. The method of claim 7, wherein the second oxygen content is not more than 2%.

9. An apparatus for conserving fresh edible products comprising:
- a storing housing having at least two storage compartments;
- a non-cryogenic air separation device comprising at least first and second separators each having an air inlet and an oxygen-depleted gas outlet, said first separator operable to supply at its outlet a gas having a first content of oxygen and at least said second separator operable in a first mode to supply at the outlet of said second separator a gas having a second content of oxygen higher than said first content, said first and second compartments being loaded with fresh products and being connected respectively to the outlet of said first separator and the outlet of said second separator operated in said first mode, wherein after a predetermined period of time, said loaded first and second compartments are supplied with a gas supplied by said air separation device having the first content of oxygen.

10. The apparatus for conserving fresh edible products of claim 9 wherein the second separator is operable in a second mode to supply at its outlet a gas having substantially the first content of oxygen.

11. The apparatus for conserving fresh edible products of claim 10 wherein each separator is a permeation membrane separator and further comprising means for modulating the outlet flow of the respective permeator to obtain the first and second contents of oxygen in the supplied gas.

12. The apparatus for conserving fresh edible products of claim 11 wherein said first and second separators are fed with a purified flow of air under pressure supplied by a common air compression unit.

13. The apparatus for conserving fresh edible products of claim 12 further comprising temperature control means for controlling the temperature of at least the second separator.

14. The apparatus for conserving fresh edible products of claim 9 wherein the first oxygen content is not more than 1%.

15. The apparatus for conserving fresh edible products of claim 14 wherein the second oxygen content is not more than 2%.

* * * * *